US007865355B2

United States Patent
Xu et al.

(10) Patent No.: US 7,865,355 B2
(45) Date of Patent: Jan. 4, 2011

(54) FAST TEXT CHARACTER SET RECOGNITION

(75) Inventors: Ming Xu, Dossenheim (DE); Nobuyoshi Mori, Lorsch (DE)

(73) Assignee: SAP Aktiengesellschaft, Walldorf (DE)

( * ) Notice: Subject to any disclaimer, the term of this patent is extended or adjusted under 35 U.S.C. 154(b) by 1026 days.

(21) Appl. No.: 10/909,262

(22) Filed: Jul. 30, 2004

(65) Prior Publication Data

US 2006/0025988 A1 Feb. 2, 2006

(51) Int. Cl.
*G06F 17/20* (2006.01)
*G06F 17/27* (2006.01)
(52) U.S. Cl. .............................................. 704/8; 704/9
(58) Field of Classification Search ................ 704/8, 704/1–10
See application file for complete search history.

(56) References Cited

U.S. PATENT DOCUMENTS

| 5,548,507 | A | * | 8/1996 | Martino et al. ............... 704/1 |
| 6,125,362 | A | * | 9/2000 | Elworthy ...................... 707/6 |
| 6,157,905 | A | * | 12/2000 | Powell ......................... 704/2 |
| 6,167,369 | A | * | 12/2000 | Schulze ........................ 704/9 |
| 6,539,118 | B1 | * | 3/2003 | Murray et al. ............. 382/229 |
| 7,359,851 | B2 | * | 4/2008 | Tong et al. .................... 704/8 |
| 2003/0009324 | A1 | * | 1/2003 | Alpha ............................ 704/9 |

OTHER PUBLICATIONS

Suzuki et al, "A language and character set determination method based on N-gram statistics", 2002, ACM Press, vol. 1 issue 3, p. 269-278.*

Li et al, A Composite Approach to Language/Encoding Detection, 2001, Proc. of the 19th International Unicode Conference, pp. 1-14.*

"Language Identification Tools", [on-line], [retrieved Mar. 15, 2005] Retrieved from the Internet <URL: http://odur.let.rug.nl/~vanoord/TestCat/competitors.html>.

"libTextCat", [on-line], [retrieved Apr. 5, 2005] Retrieved from the Internet <URL: http://software.wise-guvs.nl/libtextcat/>.

"TextCat", [on-line], [retrieved Mar. 15, 2005] Retrieved from the Internet <URL:http://odur.let.rug.nl/~vannoord/TextCat/index.html>.

Cavnar et al., "N-Gram-Based Text Categorization", in Porceedings of Third Annual Symposium on Document Analysis and INformaton Retrieval, Las Vegas, NV, UNLV Publications/Reprographics, pp. 161-175, Apr. 11-13, 1994.

Ha et al., "Extension of Zipf's Law to Words and Phrases", Proceedings of 19th International Conference on Computational Linguistics (COLING'2002), pp. 315-320, 2002.

(Continued)

*Primary Examiner*—Richemond Dorvil
*Assistant Examiner*—Olujimi A Adesanya
(74) *Attorney, Agent, or Firm*—Fish & Richardson P.C.

(57) ABSTRACT

Methods and apparatus, including computer program products, for identifying a language corresponding to a string of data include receiving a data string and dividing the data string into coded character sequences for each of a plurality of languages. A length of one or more coded character sequences varies among different languages for coded character sequences having a particular number of characters. The coded character sequences are analyzed to calculate, for each of the plurality of languages, a probability that the data string corresponds to language. The calculated probabilities are compared among the languages, and a language is identified as corresponding to the data string based on the comparison.

18 Claims, 7 Drawing Sheets

OTHER PUBLICATIONS

"rali—Applied Research in Computational Linguistics" [on-line], [retrieved Apr. 5, 2005] Retrieved from the Internet <URL: http://rali.iro.umontreal.ca/>.

"CA: Language Identifier", Xerox Research Centre Europe, [on-line], [retrieved Apr. 1, 2005] Retrieved from the Internet <URL: http://www.xrce.xerox.com/competencies/content-analysis/tools/guesser>.

Beesley, "Language Identifier: A Computer Program for Automatic Natural-Language Identification of On-line Text", *Languages at Crossroads: Proceedings of the 29th Annual Conference of the American Translators Association*, pp. 1-21, 1988.

Grefenstette, "Comparing Two Language Identification Schemes", *JADT, 3rd International Conference on Statistical Analysis of Textual Data*, pp. 1-6, 1995.

"Rosette Language Identifier", Basis Technology product information bulletin, [on-line], [retrieved Apr. 3, 2005] Retrieved from the Internet <URL:http://www.basistech.com/language%2Didentification/>.

"Basis Technology Adds Support for Middle Eastern Languages to Rosette Language Identifier",Basis Technology press release, [on-line], [retrieved May 14, 2005] Retrieved from the Internet <URL: http://www.basistech.com/press%2Dreleases/2002/middle-eastern-support-043002.html>.

"Basis Technology Unveils Endocing and Language Identifier—Verity Selects Euclid to Identify Multilingual Data", Basis Technology press release [on-line], [retrieved May 14, 2005] Retrieved from the Internet <URL: http://www.basistech.com/press%2dreleases/2000/euclid-release.html>2000.

Dunning, "Statistical Identification of Language", Computing Research Laboratory, New Mexico State University, pp. 1-29, 1994.

"Lextek Language Identifier SDK", Lextek International product bulletin [on-line], [retrieved Apr. 5, 2005] Retrieved from the Internet <URL: http://www.lextek.com/langid/>.

Ćavar, "Language ID Examples", [on-line], [retrieved Apr. 5, 2005] Retrieved from the Internet <URL: http://jones.ling.indiana.edu/~dcavar/tools/lid/index.html> last update Dec. 2003.

"Language Identification", PetaMem product demo, [on-line], [retrieved Apr. 5, 2005] Retrieved form the Internet <URL: http://nlp.petamem.com/langident.cgi> last update—Feb. 2005.

"LangWitch, the language identifier", Morphologic product demo page [on-line], [retrieved Apr. 5, 2005], Retrieved from the Internet <URL:http://www.morphologic.hu/order/langwitch.asp?user=EN>.

"Languid: a statistical language identifier", product demo [on-line], [retrieved Apr. 5, 2005] Retrieved from the Internet <URL: http://languid.cantbedone.org/> 2004.

* cited by examiner

ISO 2859-1 (Latin 1)

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 00 | NUL 0000 | STX 0001 | SOT 0002 | ETX 0003 | EOT 0004 | ENQ 0005 | ACK 0006 | BEL 0007 | BS 0008 | HT 0009 | LF 000A | VT 000B | FF 000C | CR 000D | SO 000E | SI 000F |
| 10 | DLE 0010 | DC1 0011 | DC2 0012 | DC3 0013 | DC4 0014 | NAK 0015 | SYN 0016 | ETB 0017 | CAN 0018 | EM 0019 | SUB 001A | ESC 001B | FS 001C | GS 001D | RS 001E | US 001F |
| 20 | SP 0020 | ! 0021 | " 0022 | # 0023 | $ 0024 | % 0025 | & 0026 | ' 0027 | ( 0028 | ) 0029 | * 002A | + 002B | , 002C | - 002D | . 002E | / 002F |
| 30 | 0 0030 | 1 0031 | 2 0032 | 3 0033 | 4 0034 | 5 0035 | 6 0036 | 7 0037 | 8 0038 | 9 0039 | : 003A | ; 003B | < 003C | = 003D | > 003E | ? 003F |
| 40 | @ 0040 | A 0041 | B 0042 | C 0043 | D 0044 | E 0045 | F 0046 | G 0047 | H 0048 | I 0049 | J 004A | K 004B | L 004C | M 004D | N 004E | O 004F |
| 50 | P 0050 | Q 0051 | R 0052 | S 0053 | T 0054 | U 0055 | V 0056 | W 0057 | X 0058 | Y 0059 | Z 005A | [ 005B | \ 005C | ] 005D | ^ 005E | _ 005F |
| 60 | ` 0060 | a 0061 | b 0062 | c 0063 | d 0064 | e 0065 | f 0066 | g 0067 | h 0068 | i 0069 | j 006A | k 006B | l 006C | m 006D | n 006E | o 006F |
| 70 | p 0070 | q 0071 | r 0072 | s 0073 | t 0074 | u 0075 | v 0076 | w 0077 | x 0078 | y 0079 | z 007A | { 007B | \| 007C | } 007D | ~ 007E | DEL 007F |
| 80 | | | | | | | | | | | | | | | | |
| 90 | | | | | | | | | | | | | | | | |
| A0 | NBSP 00A0 | ¡ 00A1 | ¢ 00A2 | £ 00A3 | ¤ 00A4 | ¥ 00A5 | ¦ 00A6 | § 00A7 | ¨ 00A8 | © 00A9 | ª 00AA | « 00AB | ¬ 00AC | - 00AD | ® 00AE | ¯ 00AF |
| B0 | ° 00B0 | ± 00B1 | ² 00B2 | ³ 00B3 | ´ 00B4 | µ 00B5 | ¶ 00B6 | · 00B7 | ¸ 00B8 | ¹ 00B9 | º 00BA | » 00BB | ¼ 00BC | ½ 00BD | ¾ 00BE | ¿ 00BF |
| C0 | À 00C0 | Á 00C1 | Â 00C2 | Ã 00C3 | Ä 00C4 | Å 00C5 | Æ 00C6 | Ç 00C7 | È 00C8 | É 00C9 | Ê 00CA | Ë 00CB | Ì 00CC | Í 00CD | Î 00CE | Ï 00CF |
| D0 | Ð 00D0 | Ñ 00D1 | Ò 00D2 | Ó 00D3 | Ô 00D4 | Õ 00D5 | Ö 00D6 | × 00D7 | Ø 00D8 | Ù 00D9 | Ú 00DA | Û 00DB | Ü 00DC | Ý 00DD | Þ 00DE | ß 00DF |
| E0 | à 00E0 | á 00E1 | â 00E2 | ã 00E3 | ä 00E4 | å 00E5 | æ 00E6 | ç 00E7 | è 00E8 | é 00E9 | ê 00EA | ë 00EB | ì 00EC | í 00ED | î 00EE | ï 00EF |
| F0 | ð 00F0 | ñ 00F1 | ò 00F2 | ó 00F3 | ô 00F4 | õ 00F5 | ö 00F6 | ÷ 00F7 | ø 00F8 | ù 00F9 | ú 00FA | û 00FB | ü 00FC | ý 00FD | þ 00FE | ÿ 00FF |

FIG. 1

|    | 00 | 01 | 02 | 03 | 04 | 05 | 06 | 07 | 08 | 09 | 0A | 0B | 0C | 0D | 0E | 0F |
|----|----|----|----|----|----|----|----|----|----|----|----|----|----|----|----|----|
| 00 | NUL 0000 | STX 0001 | SOT 0002 | ETX 0003 | EOT 0004 | ENQ 0005 | ACK 0006 | BEL 0007 | BS 0008 | HT 0009 | LF 000A | VT 000B | FF 000C | CR 000D | SO 000E | SI 000F |
| 10 | DLE 0010 | DC1 0011 | DC2 0012 | DC3 0013 | DC4 0014 | NAK 0015 | SYN 0016 | ETB 0017 | CAN 0018 | EM 0019 | SUB 001A | ESC 001B | FS 001C | GS 001D | RS 001E | US 001F |
| 20 | SP 0020 | ! 0021 | " 0022 | # 0023 | $ 0024 | % 0025 | & 0026 | ' 0027 | ( 0028 | ) 0029 | * 002A | + 002B | , 002C | - 002D | . 002E | / 002F |
| 30 | 0 0030 | 1 0031 | 2 0032 | 3 0033 | 4 0034 | 5 0035 | 6 0036 | 7 0037 | 8 0038 | 9 0039 | : 003A | ; 003B | < 003C | = 003D | > 003E | ? 003F |
| 40 | @ 0040 | A 0041 | B 0042 | C 0043 | D 0044 | E 0045 | F 0046 | G 0047 | H 0048 | I 0049 | J 004A | K 004B | L 004C | M 004D | N 004E | O 004F |
| 50 | P 0050 | Q 0051 | R 0052 | S 0053 | T 0054 | U 0055 | V 0056 | W 0057 | X 0058 | Y 0059 | Z 005A | [ 005B | ¥ 005C | ] 005D | ^ 005E | _ 005F |
| 60 | ` 0060 | a 0061 | b 0062 | c 0063 | d 0064 | e 0065 | f 0066 | g 0067 | h 0068 | i 0069 | j 006A | k 006B | l 006C | m 006D | n 006E | o 006F |
| 70 | p 0070 | q 0071 | r 0072 | s 0073 | t 0074 | u 0075 | v 0076 | w 0077 | x 0078 | y 0079 | z 007A | { 007B | \| 007C | } 007D | ~ 007E | DEL 007F |
| 80 |    | 81 | 82 | 83 | 84 | 85 | 86 | 87 | 88 | 89 | 8A | 8B | 8C | 8D | 8E | 8F |
| 90 | 90 | 91 | 92 | 93 | 94 | 95 | 96 | 97 | 98 | 99 | 9A | 9B | 9C | 9D | 9E | 9F |
| A0 |    | FF61 | FF62 | FF63 | FF64 | FF65 | FF66 | FF67 | FF68 | FF69 | FF6A | FF6B | FF6C | FF6D | FF6E | FF6F |
| B0 | FF70 | FF71 | FF72 | FF73 | FF74 | FF75 | FF76 | FF77 | FF78 | FF79 | FF7A | FF7B | FF7C | FF7D | FF7E | FF7F |
| C0 | FF80 | FF81 | FF82 | FF83 | FF84 | FF85 | FF86 | FF87 | FF88 | FF89 | FF8A | FF8B | FF8C | FF8D | FF8E | FF8F |
| D0 | FF90 | FF91 | FF92 | FF93 | FF94 | FF95 | FF96 | FF97 | FF98 | FF99 | FF9A | FF9B | FF9C | FF9D | FF9E | FF9F |
| E0 | E0 | E1 | E2 | E3 | E4 | E5 | E6 | E7 | E8 | E9 | EA | EB | EC | ED | EE | EF |
| F0 | F0 | F1 | F2 | F3 | F4 | F5 | F6 | F7 | F8 | F9 | FA | FB | FC |    |    |    |

FIG. 4A

Lead Byte = 0x8E

| | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 40 | 察<br>5BDF | 拶<br>62F6 | 撮<br>64AE | 擦<br>64E6 | 札<br>672D | 殺<br>6BBA | 薩<br>85A9 | 雑<br>96D1 | 皐<br>7690 | 鯖<br>9BD6 | 捌<br>634C | 錆<br>9306 | 鮫<br>9BAB | 皿<br>76BF | 晒<br>6652 | 三<br>4E09 |
| 50 | 傘<br>5098 | 参<br>53C2 | 山<br>5C71 | 惨<br>60E8 | 撒<br>6492 | 散<br>6563 | 桟<br>685F | 燦<br>71E6 | 珊<br>73CA | 産<br>7523 | 算<br>7B97 | 纂<br>7E82 | 蚕<br>8695 | 讃<br>8B83 | 賛<br>8CDB | 酸<br>9178 |
| 60 | 餐<br>9910 | 斬<br>65AC | 暫<br>66AB | 残<br>6B8B | 仕<br>4ED5 | 仔<br>4ED4 | 伺<br>4F3A | 使<br>4F7F | 刺<br>523A | 司<br>53F8 | 史<br>53F2 | 嗣<br>55E3 | 四<br>56DB | 士<br>58EB | 始<br>59CB | 姉<br>59C9 |
| 70 | 姿<br>59FF | 子<br>5B50 | 屍<br>5C4D | 市<br>5E02 | 師<br>5E2B | 志<br>5FD7 | 思<br>601D | 指<br>6307 | 支<br>652F | 孜<br>5B5C | 斯<br>65AF | 施<br>65BD | 旨<br>65E8 | 枝<br>679D | 止<br>6B62 | |
| 80 | 死<br>6B7B | 氏<br>6C0F | 獅<br>7345 | 祉<br>7949 | 私<br>79C1 | 糸<br>7CF8 | 紙<br>7D19 | 紫<br>7D2B | 肢<br>80A2 | 脂<br>8102 | 至<br>81F3 | 視<br>8996 | 詞<br>8A5E | 詩<br>8A69 | 試<br>8A66 | 誌<br>8A8C |
| 90 | 諮<br>8AEE | 資<br>8CC7 | 賜<br>8CDC | 雌<br>96CC | 飼<br>98FC | 歯<br>6B6F | 事<br>4E8B | 似<br>4F3C | 侍<br>4F8D | 児<br>5150 | 字<br>5B57 | 寺<br>5BFA | 慈<br>6148 | 持<br>6301 | 時<br>6642 | 次<br>6B21 |
| A0 | 滋<br>6ECB | 治<br>6CBB | 爾<br>723E | 璽<br>74BD | 痔<br>75D4 | 磁<br>78C1 | 示<br>793A | 而<br>800C | 耳<br>8033 | 自<br>81EA | 蒔<br>8494 | 辞<br>8F9E | 汐<br>6C50 | 鹿<br>9E7F | 式<br>5F0F | 識<br>8B58 |
| B0 | 鴫<br>9D2B | 竺<br>7AFA | 軸<br>8EF8 | 宍<br>5B8D | 雫<br>96EB | 七<br>4E03 | 叱<br>53F1 | 執<br>57F7 | 失<br>5931 | 嫉<br>5AC9 | 室<br>5BA4 | 悉<br>6089 | 湿<br>6E7F | 漆<br>6F06 | 疾<br>75BE | 質<br>8CEA |
| C0 | 実<br>5B9F | 蔀<br>8500 | 篠<br>7BE0 | 偲<br>5072 | 柴<br>67F4 | 芝<br>829D | 屡<br>5C61 | 蕊<br>854A | 縞<br>7E1E | 舎<br>820E | 写<br>5199 | 射<br>5C04 | 捨<br>6368 | 赦<br>8D66 | 斜<br>659C | 煮<br>716E |
| D0 | 社<br>793E | 紗<br>7D17 | 者<br>8005 | 謝<br>8B1D | 車<br>8ECA | 遮<br>906E | 蛇<br>86C7 | 邪<br>90AA | 借<br>501F | 勺<br>52FA | 尺<br>5C3A | 杓<br>6753 | 灼<br>707C | 爵<br>7235 | 酌<br>914C | 釈<br>91C8 |
| E0 | 錫<br>932B | 若<br>82E5 | 寂<br>5BC2 | 弱<br>5F31 | 惹<br>60F9 | 主<br>4E3B | 取<br>53D6 | 守<br>5B88 | 手<br>624B | 朱<br>6731 | 殊<br>6B8A | 狩<br>72E9 | 珠<br>73E0 | 種<br>7A2E | 腫<br>816B | 趣<br>8DA3 |
| F0 | 酒<br>9152 | 首<br>9996 | 儒<br>5112 | 受<br>53D7 | 呪<br>546A | 寿<br>5BFF | 授<br>6388 | 樹<br>6A39 | 綬<br>7DAC | 需<br>9700 | 囚<br>56DA | 収<br>53CE | 周<br>5468 | | | |

FIG. 4B

FAST TEXT CHARACTER SET RECOGNITION

BACKGROUND

The present invention relates to data processing by digital computer, and more particularly to identifying a language encoded in a data string.

Text is typically electronically stored as a string of data. The data string, for example, can represent text characters as code points having a hexadecimal byte value. The hexadecimal byte value maps to a particular character in one or more coded character sets. A character set describes a relationship between each character and a respective code point where each code point codes for a single character. There are a number of ISO character sets, for example, ISO 8859-1, which maps a set of Latin characters to their respective code points. Other character sets are created by different entities; for example, there are a number of Microsoft Windows character sets. FIG. 1 illustrates a character set for ISO 8859-1 (Latin 1). In byte form, each Latin 1 character has a one-byte hexadecimal code point value. For example, the letter "Ä" has a value of 0x41. The same code point value can correspond to different characters in different character sets. For example, the code point 0xCA corresponds to the symbol "Ä" in ISO 8859-1, but the same code point corresponds to the symbol "Δ" in ISO 8859-7 (Greek). Thus, the hexadecimal byte value defines a coordinate position for a character set but does not identify which character set of the available characters sets the value belongs. In other characters sets, a code point includes more than one byte.

Consequently, there can be a string of hexadecimal byte values that each define a position that exists in multiple different character sets. The identity of the character residing in the position corresponding to the hexadecimal byte value depends on the particular character set. As a result it is often difficult to identify the character itself without information in the data string identifying the language of the hexadecimal byte values, it can be difficult to determine the language corresponding to the data string. When translating the data string into another form, for example, into Unicode or to display the text, it is necessary to know the language corresponding to the data string.

SUMMARY OF THE INVENTION

The present invention provides methods and systems, including computer program products, that implement techniques for identifying a language from a string of data.

In general, in one aspect, the specification provides a method and computer program product for identifying a language corresponding to a string of data. The method includes receiving a data string, dividing the data string into coded character sequences for each of a plurality of languages, wherein a length of one or more coded character sequences varies among different languages for coded character sequences having a particular number of characters, analyzing the coded character sequences to calculate, for each of the plurality of languages, a probability that the data string corresponds to language, comparing the calculated probabilities among the languages, and identifying a language as corresponding to the data string based on comparing the calculated probabilities.

Implementations may include one or more of the following features. The data string can include a string of code points defining characters of a language. At least one of the code points can define a double-byte encoded character.

Dividing the data string can further include selecting, for each of the plurality of languages, a character set that maps characters to code points, identifying a first character set that includes characters encoded using a first number of bytes and a second character set that includes characters encoded using a second number of bytes and dividing the data string into coded character sequences corresponding to an equal number of characters but a different number of bytes for each of a first language corresponding to the first character set and a second language corresponding to the second character set. The data string can be divided, for each of the plurality of languages, into multiple sets of coded character sequences, with the coded character sequences in each set having a different number of characters from the coded character sequences in another of the sets. The calculated probability for each of the plurality of languages can include probabilities calculated for each of the multiple sets of coded character sequences. Each set of coded character sequences can be selected from the group consisting of a unigram, bi-gram, tri-gram, quarto-gram, and n-gram sequence with n having an integer value.

Identifying a language can further include identifying, as the language corresponding to the data string, a language having a calculated probability indicating that the data string is more likely, by at least a threshold amount, to correspond to the language than to correspond to any other language from the plurality of languages.

Analyzing the coded character sequences can further include identifying any nonvalid code points, if a coded character sequence for a language includes a nonvalid code point, determining that the data string does not correspond to the language, and if a coded character sequence for a language does not include nonvalid code points but does not match any coded character sequence in a collection of statistical information for the language, calculating the probability for the set of coded character sequences for the particular language without considering the particular coded character sequence. The nonvalid code points can include at least one of unused code points or illegal code points.

Comparing the calculated probabilities can further include performing a secondary analysis on the coded character sequences for languages having similar calculated probabilities. The secondary analysis can include using language characteristics to identify an unlikely character combination, and determining the language corresponding to the data string using the secondary analysis results.

In general, in another aspect, the specification provides a system for identifying a language corresponding to a string of data. The system includes means for receiving a data string, means for dividing the data string into coded character sequences for each of a plurality of languages, wherein a length of one or more coded character sequences varies among different languages for coded character sequences having a particular number of characters, means for analyzing the coded character sequences to calculate, for each of the plurality of languages, a probability that the data string corresponds to the language, means for comparing the calculated probabilities among the languages in the plurality of languages, and means for identifying a language as corresponding to the data string based on comparing the calculated probabilities.

The invention can be implemented to realize one or more of the following advantages. The process can identify languages from a data string. The process can identify double-byte encoded characters prior to analyzing the data string. Languages including double-byte characters such as Japanese, Chinese, and Korean can be identified from data string. The data string can be further analyzed after determining a probability in order to eliminate languages having illegal or unused code points. Secondary analysis can also be used to eliminate languages having similar probabilities. The secondary analysis can examine properties of the characters in order to eliminate languages. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 1 illustrates a character set.

FIGS. 4A and 4B illustrate a double-byte encoded character set.

Like reference numbers and designations in the various drawings indicate like elements.

DETAILED DESCRIPTION

Figure 2:
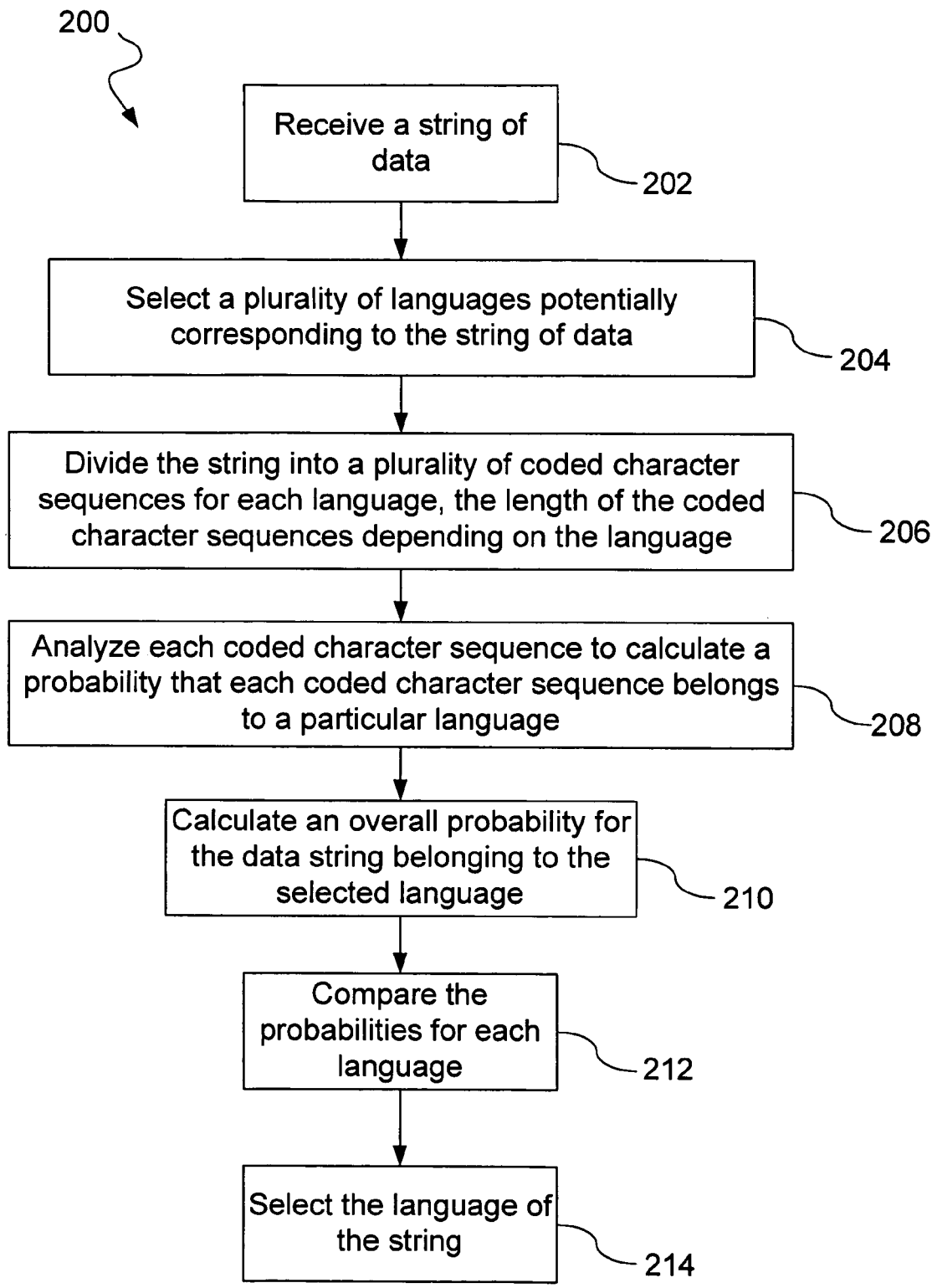
FIG. 2 is a flowchart illustrating a process for determining a language associated with a data string.

FIG. 2 illustrates a process 200 for determining a language associated with a data string. The process 200 begins following receipt of a data string (step 202). For example, the data string can be received by a computer over a network. The data string can include an encoding for a plurality of characters corresponding to a particular language. Different techniques for encoding a particular language are possible. In one implementation, the string of data includes a string of hexadecimal byte value code points corresponding to a particular language, although the data string may also include code points corresponding to more than one language and code points intermixed with other data. Assuming the string of code points represents a language, it may not be clear which language that the code points correspond to because the code points are represented in the data string as hexadecimal byte values that are not unique for each language. Each code point is represented by hexadecimal byte values. If the language is unknown, the data string is processed to identify the language.

After receiving the data string, a plurality of languages are selected as potentially corresponding to the data string (step 204). For example, in one implementation, the data string is analyzed under a presumption that it includes code points corresponding to one particular language from a set of candidate languages. The presumption can be tested through analysis to identify the correct language. For each potential language, the data string is divided into a plurality of coded character sequences (step 206). Each coded character sequence includes one or more code points. The length of the coded character sequences, or number of bytes, for a particular number of characters can vary depending on the language presumed for the data string. For example, a single Latin character is typically represented by a code point with a single byte length, while a single character in an Asian langue is typically represented by a code point with a double byte length.

As shown in FIG. 2, after the data string is divided into a plurality of coded character sequences having a particular character length, each coded character sequence is analyzed to determine a probability that the coded character sequence belongs to the particular language presumed to be associated with the data string (step 208). To determine the probability for each coded character sequence, the character or character combination contained within each coded character sequence is compared with statistical information for that language.

A mathematical relationship can exist between the frequency at which a character occurs in a language sample and the overall rank of the character in the sample. The relationship between frequency and rank exists in different languages as well as in text samples broken up into different numbers of characters or even words. In one implementation, the use of a large sample text can be used to generate the statistical relationship for a particular language based on a particular number of characters. Consequently, the relationship between frequency and rank for text samples of different character numbers and different languages can be used to determine a probability that certain character combinations belong to a specific language.

For example, for a sample of Latin characters in English, the frequency/rank relationship can be calculated for different two letter combinations, e.g., AB, BC, CD, DE, EF. Thus, the frequency of the character combination AB in a sample is calculated, not the frequency of A and B separately. A number of statistics can be generated for each language, for example a statistic for character numbers 1-n in an n-byte sequence. Therefore, the analysis can be performed on coded character sequences representing different numbers of characters.

The information from the statistical analysis can be used to generate statistical information describing the probability of different characters and/or character combinations occurring for a given language. For each language, a statistical table can be generated that illustrates different character combinations and each respective probability. Using, for example, a lookup table of the statistical information for the language and number of characters in a coded character sequence, the probability for each particular coded character sequence can be calculated.

The code points corresponding to certain characters can be common in one language while rare in others. For example, the code point 0x49 in Latin 1 represents the commonly used letter "I" in English. However, 0x49 can map a character that is either used infrequently or not at all in other languages. If a code point maps a character that is commonly used in one language but not in others, it is more likely that a coded character sequence including that code point belongs to the language in which it is more commonly used. Therefore, the probability represents the likelihood that the character or characters of the coded character sequence belong to a particular language.

Once the probability for each coded character sequence is calculated, an overall probability that the data string corresponds to a particular language can also be calculated. For example, in one implementation, the overall probability is calculated as the product of the probabilities for each coded character sequence. Other mathematical means for calculating a combined probability can be used. Different numbers of coded character sequences can be analyzed, and it is not required to analyze every coded character sequence for a given string of code points. However, using more coded character sequences reduces the likelihood of erroneously selecting an incorrect language caused by not having a comprehensive analysis. For example, if only one coded character sequence is examined, the statistic can indicate a high probability that the code points belong to one language over another. However, it is possible that the coded character sequence actually belongs to a different language having a lower probability, but the coded character sequence used happened to relate to a valid but less frequently used character or character combination for that language. The use of several, or all of the coded character sequences from a string of code points reduces the probability of a mistaken language selection. An overall probability that the data string corresponds to a particular language is calculated for each language (step 210).

After determining the overall probabilities for each language, the probabilities can be compared to determine the language that the string of code points corresponds to (step 212). Based on the comparison of probabilities, the correct language corresponding to the string of code points can be selected (step 214).

Figure 3:
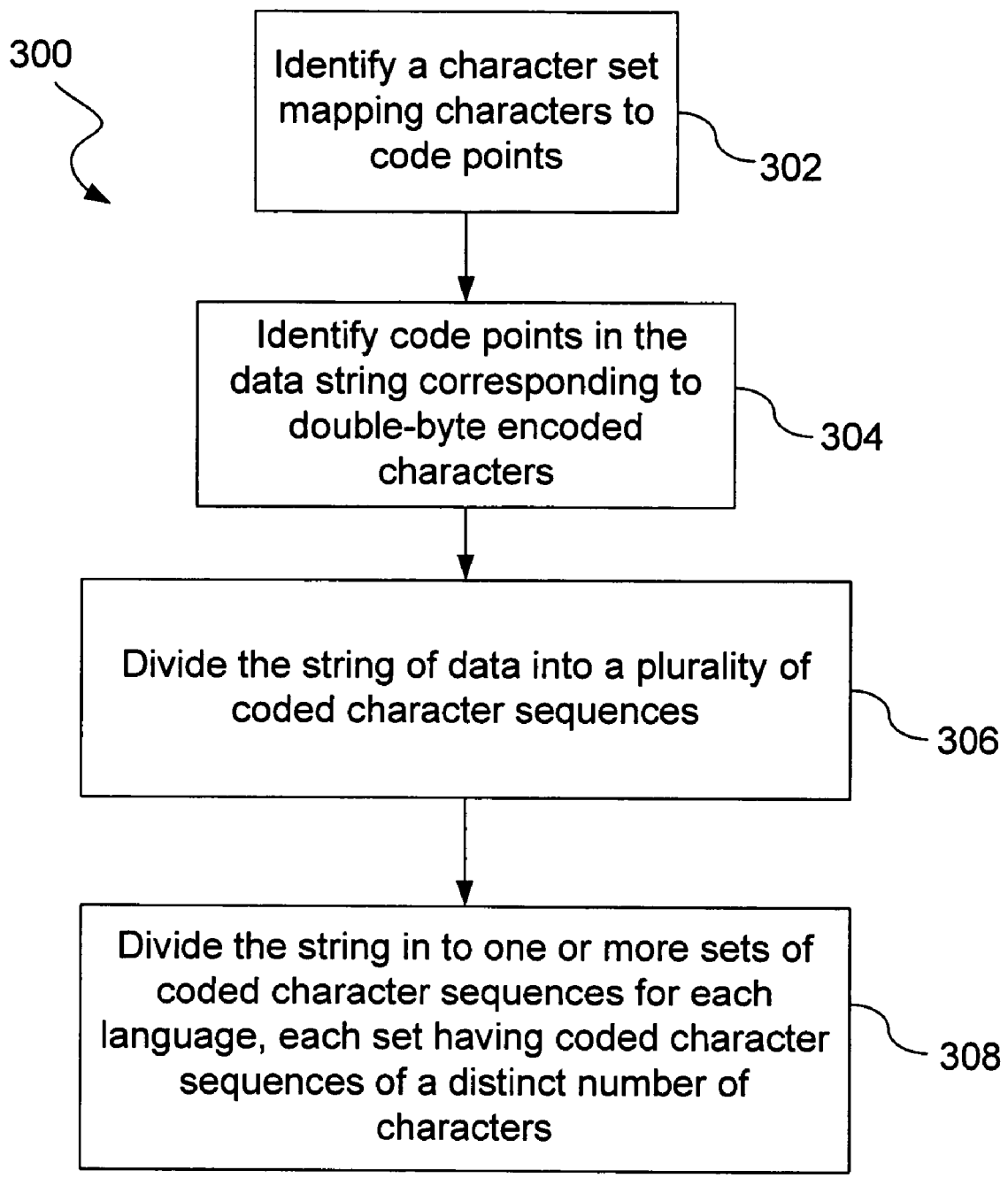
FIG. 3 is a flowchart illustrating a process for dividing a data string into coded character sequences.

A process 300 for dividing the data string is illustrated in FIG. 3. For each language, a corresponding character set is identified that maps characters from that language to the presumed code points in the data string (step 302). For some languages, more than one character set can be identified. In some character sets, such as ISO 8859-1, each character is defined by one single byte value code point, for example, the letter "A" represented as 0x41. However, for other languages, the corresponding character set includes characters that are defined by a pair of bytes. Thus, it takes two singe byte hexadecimal values to define each character. These characters are said to be double-byte encoded. Several Asian languages, such as Japanese and Chinese include double-byte encoded characters.

An example of a character set including double-byte characters is illustrated in FIGS. 4A and 4B. FIG. 4A illustrates a portion of a Japanese character set. Several code point portions are designated as lead bytes 402 for double-byte encoded characters. The lead byte makes up half of the hexadecimal byte required to define the character. Lead byte 404, corresponding to 0x8E is the lead byte for the characters shown in FIG. 4B. The characters shown in FIG. 4B are double-byte encoded characters. For example, the upper left character can be represented as 0x8E+0x40, or the shortened form of 8E40.

The character set is used to identify any code points in the data string that correspond to a double-byte encoded character (step 304). Once any code points corresponding to double-byte encoded characters have been identified, the data string can be divided into a plurality of coded character sequences (step 306). Each coded character sequence includes one or more code points where each code point corresponds to a single character. For example, in one implementation, each coded character sequence includes two code points corresponding to two characters. However, even if the number of characters is constant, the length of the coded character sequences can vary depending on the inclusion of any double-byte characters in the string of bytes. For example, in a single-byte encoded character set, two characters can be represented by two bytes. In another example, if the character set includes both single byte and double-byte characters, two characters can be represented by 2-4 bytes depending on the encoding for each character. As a result, the length of the coded character sequences can differ depending on the character set used.

The data string is divided into a plurality of bytes sequences for each language. Therefore, the length of the coded character sequences can vary depending on the language because some languages are single-byte encoded and other languages are double-byte encoded. The number of characters included in each coded character sequence can also be varied in different implementations. In one implementation, the data string is divided into several sets of coded character sequences for each language, each set having coded character sequences of a distinct number of characters (step 308). For example, the data string can be broken up in different ways to produce coded character sequences having a particular number of characters, e.g., uni-gram, bi-gram, tri-gram, or quarto-gram representing coded character sequences having 1, 2, 3, and 4 characters respectively. For example, if the data string is ABCDEF, the data string can be divided in to coded character sequences of A, B, C, D, E, F; AB, CD, EF; and ABC, DEF. The analysis can then be performed for each language using coded character sequences having an equal number of characters, or alternatively, the analysis can be performed taking into account dividing the data string into different numbers of characters. A probability calculation can be performed for each division of the data string. An overall probability can be calculated as part of step 210 using the different probabilities of data string based on different numbers of characters.

Figure 5:
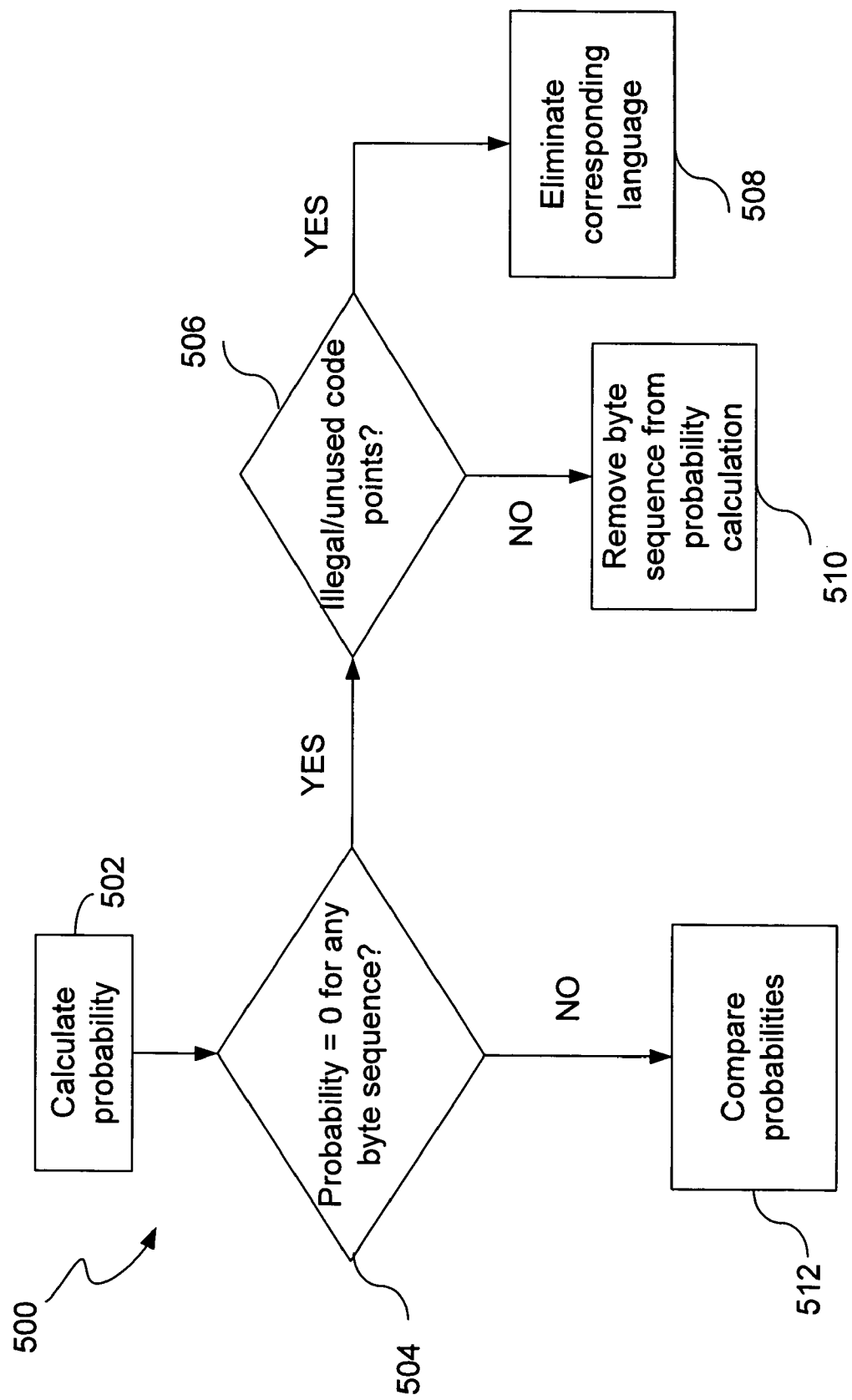
FIG. 5 is a flowchart illustrating a process for analyzing coded character sequences for a plurality of languages.

In one implementation, if the probability for a particular coded character sequence is calculated to be zero, a secondary analysis is performed on the coded character sequence as part of step 210 discussed above (see FIG. 2). FIG. 5 illustrates a process 500 for analyzing a coded character sequence when one or more coded character sequences has a calculated probability of zero. The process begins by calculating the probability for each coded character sequence (step 502). The calculated probability for each coded character sequence is examined to determine if the calculated probably is zero for any coded character sequences (step 504). If the calculated probability for a coded character sequence is zero, the code points can be further analyzed. The code points in the coded character sequence can be compared with the code point definitions of the character set to identify any illegal or unused code points in the coded character sequence (step 506). Each character set includes code points having a specific range of values. For example, Latin 1 has a range of code point values from 0x00 to 0xFF (FIG. 1). Illegal code points are code points that have a value defined outside the range of values for that character set. For example, a code point having a value of 0xEEF in Latin 1 is an illegal code point because it is not within the defined range for the Latin 1 character set. An illegal code point can indicate that the presumed language does not match the data string or that the data string or portion thereof is not defining language characters. For example, the string of data can be binary data. Unused code points are code points within the range of code point values for a character set, but the particular code point is not defined in the character set. For example, the character set for Latin 1 includes blank spaces for unused code points e.g., 0x81.

If the character set is eliminated because a code point does not correspond to a character within the character set, then the data string (or at least a portion thereof) does not belong to the language represented by the character set. If a coded character sequence includes an unused or illegal code point, the language or languages corresponding to the character set are eliminated from consideration (step 508). If an unused or illegal code point is found in a particular coded character sequence, the particular coded character sequence can be eliminated from the overall probability calculation for the string of code points (step 510). If none of the coded character sequences have a probability equal to zero, the processing of the string of code points continues, for example, by comparing the probabilities for different languages (step 512).

In some cases, the probability for a coded character sequence can be zero without having any unused or illegal code points. The probability can be zero because the particular character combination in the coded character sequence is valid but was not included in the calculation statistic. For example, if the particular character combination is rare, the sample text used to generate the statistic may not have included the character combination even though the character combination is valid. If the probability is zero and the coded character sequence does not include any illegal or unused code points, the coded character sequence can be omitted from the calculation of the overall probability for the data string so that the overall probability is nonzero (step 510). Therefore, by identifying unused and illegal code points, some languages can be omitted from further consideration. Additionally, the secondary analysis can be used to eliminate other sources of zero probabilities.

Figure 6:
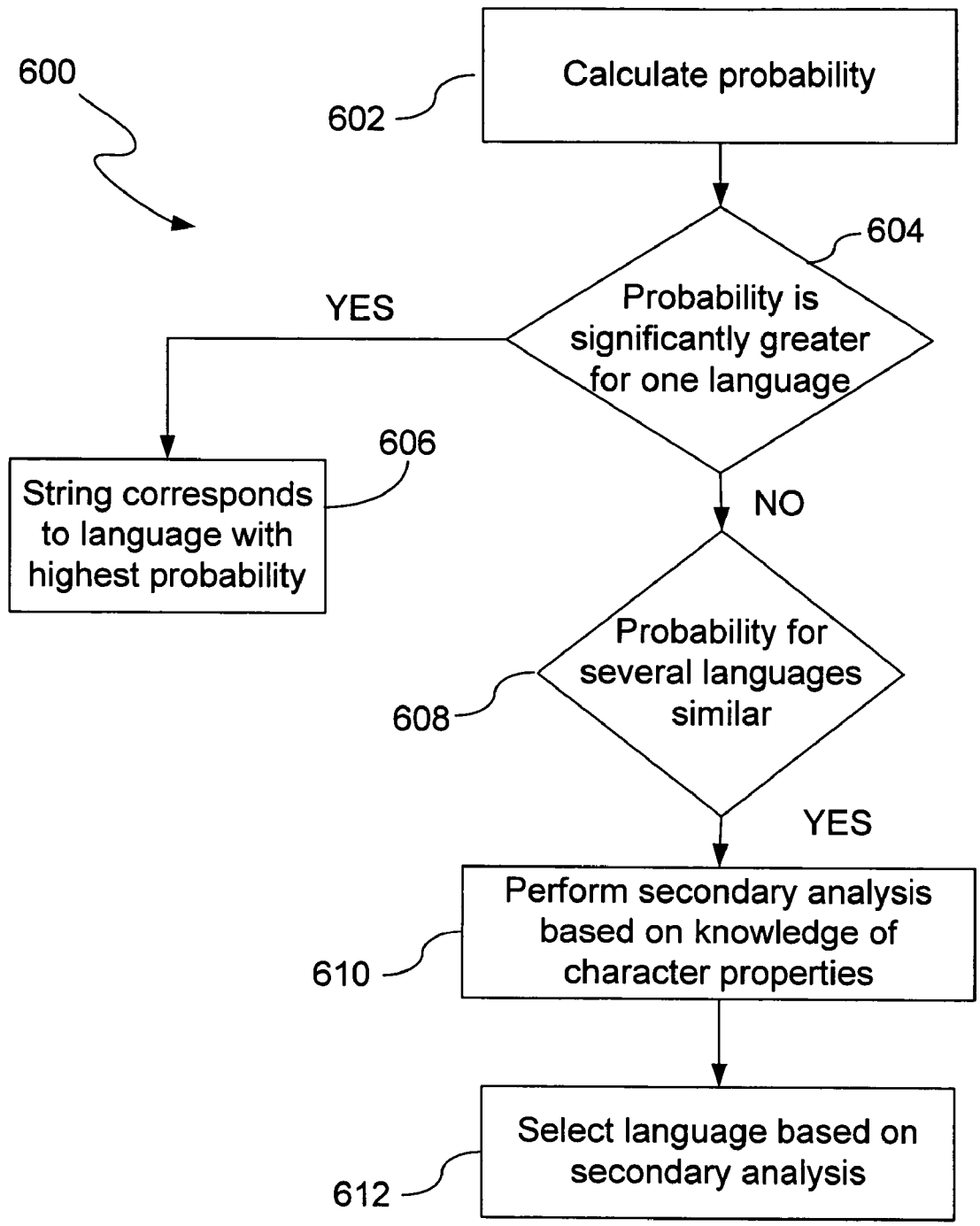
FIG. 6 is a flowchart illustrating a process for comparing probabilities for different languages.

FIG. 6 illustrates a process 600 for comparing the overall probabilities for different languages. The process begins with the calculation of probabilities for each language (step 602). The probabilities are compared to determine whether the calculated probability for one language is significantly greater than the probabilities for the other languages (step 604). If the difference in probabilities is greater than a predetermined threshold, a selection of the language having the greatest probability can be made without further comparison (step 606). The threshold difference can be, for example, and absolute difference between the probabilities, a percentage difference, a scaled difference, or some other amount. In one implementation, the language associated with the greatest probability is selected regardless of the difference between probabilities. In other implementations, however, there can be more than one probability that is closely related to another probability such that the language cannot be determined without further analysis (step 608). For example, the difference between the probabilities is less than the threshold amount. A secondary analysis can be performed on the coded character sequences for the languages having similar probabilities (step 610).

The secondary analysis can apply different functions on presumed characters, corresponding to the code points in the coded character sequences, that use information about different character properties to eliminate languages. In one implementation, a function called ISALPHA is applied to the coded character sequences. The ISALPHA function can determine whether or not each code point in the coded character sequences correspond to a text character or a symbol in the character set. The context provided by surrounding characters can be used to determine whether or not a symbol can be present in a given position relative to other code points. For example, if the probability for a string of code points is similar for both ISO 8859-1 (Latin 1) and ISO 8859-2 (Latin 2) character sets, a function called ISALPHA can be used to eliminate one of the character sets. One of the code points can represent a language character in one character set and a symbol in another character set. For example, the code point 0xB6 represent "ś" in Latin 2 and "¶" in Latin 1. By examining the surrounding code points it can be determined that the code point is part of a word, which in Latin 2 is "Księgowość" and in Latin 1 is "Ksi¶gowo¶æ". Because it is unlikely that ¶ is part of a word, while Księgowość is the word for "accounting" in Polish, the Latin 1 character set can be eliminated and a the language can be selected as Latin 2 corresponding to Polish.

If a code point represents a symbol in, for example, two different character sets having similar probabilities, the context of related code points can again be used to determine the correct character set. For example, the code point 0xA2 represents "¢" in Latin 1 and "" in Latin 2. The character can not stand alone and must be coupled to a particular character or characters while ¢ can stand alone without any other required characters. Therefore, if there are not code points adjacent to which are required for the symbol to be present, the symbol must instead be ¢ and the Latin 2 character set can therefore be eliminated.

Other techniques or functions can be used to provide a secondary analysis to the code points to select the correct language for the data string. The language is then selected based on the secondary analysis (step 612). Once the language has been identified, other processes can then occur. For example, after determining the language, the string of code points can be translated, for example into text characters for display or into Unicode for transmission.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Other embodiments are within the scope of the following claims.

What is claimed is:

1. A method for identifying a language corresponding to a string of data, comprising:
receiving a data string from memory, the data string comprising a string of code points defining characters of a language where one or more of the code point values corresponds to more than one distinct character set, the data string having been electronically stored in the memory;
dividing the data string into a plurality of coded character sequences for each of a plurality of languages to represent the same number of characters in each language of the plurality of languages, wherein a length of one or more coded character sequences varies among different languages;
analyzing the coded character sequences to calculate, for each of the plurality of languages, an overall probability that the data string corresponds to a particular language, the analyzing coded character sequences for each language including:
calculating a probability for each coded character sequence using statistical information, the probability being the probability that the particular coded character sequence corresponds to the language,
determining that a probability for any of the coded character sequences is zero,
comparing a code point of a coded character sequence having a probability of zero to respective code point definitions of each of the plurality of languages to affect a comparison,
determining that the coded character sequence includes illegal code points for at least one language of the plurality of languages based on the comparison and eliminating the at least one language as a language to which the coded character sequence could correspond,
removing the probability from an overall probability calculation when determining that the probability is zero and that the coded character sequence does not include an illegal code point, and
using the probabilities to calculate the overall probability that the data string corresponds to the language;
comparing the calculated overall probabilities among the languages; and
identifying a language as corresponding to the data string based on comparing the calculated overall probabilities.

2. The method of claim 1, wherein at least one of the code points defines a double-byte encoded character.

3. The method of claim 1, wherein dividing the data string further comprises:
selecting, for each of the plurality of languages, a character set that maps characters to code points;
identifying a first character set that includes characters encoded using a first number of bytes and a second character set that includes characters encoded using a second number of bytes; and
dividing the data string into coded character sequences corresponding to an equal number of characters but a different number of bytes for each of a first language corresponding to the first character set and a second language corresponding to the second character set.

4. The method of claim 3, wherein the data string is divided, for each of the plurality of languages, into multiple sets of coded character sequences, with the coded character sequences in each set having a different number of characters from the coded character sequences in another of the sets.

5. The method of claim 4, wherein the calculated overall probability for each of the plurality of languages comprises probabilities calculated for each of the multiple sets of coded character sequences.

6. The method of claim 4, wherein each set of coded character sequences is selected from the group consisting of a unigram, bi-gram, tri-gram, quarto-gram, and n-gram sequence with n having an integer value.

7. The method of claim 1, wherein identifying a language further comprises:
identifying, as the language corresponding to the data string, a language having a calculated overall probability indicating that the data string is more likely, by at least a threshold amount, to correspond to the language than to correspond to any other language from the plurality of languages.

8. The method of claim 1, wherein analyzing the coded character sequences further comprises:
identifying any unused code points;
when a coded character sequence for a language includes an unused code point, determining that the data string does not correspond to the language; and
when a coded character sequence for a language does not include unused code points but does not match any coded character sequence in a collection of statistical information for the language, calculating the overall probability for the set of coded character sequences for the particular language without considering the particular coded character sequence.

9. The method of claim 1, wherein comparing the calculated overall probabilities further comprises:
performing a secondary analysis on the coded character sequences for languages having similar calculated probabilities, including:
using language characteristics to identify an unlikely character combination; and determining the language corresponding to the data string using the secondary analysis results.

10. A system for identifying a language corresponding to a string of data, comprising:
one or more processors; and
a non-transitory computer-readable storage medium coupled to the one or more processors having instructions stored thereon which, when executed by the one or more processors, cause the one or more processors to perform operations comprising:
receiving a data string comprising a string of code points defining characters of a language where one or more of the code point values corresponds to more than one distinct character set;
dividing the data string into coded character sequences for each of a plurality of languages to represent the same number of characters in each language of the plurality of languages, wherein a length of one or more coded character sequences varies among different languages;
analyzing the coded character sequences to calculate, for each of the plurality of languages, an overall probability that the data string corresponds to a particular language, the analyzing coded character sequences for each language including:
calculating a probability for each coded character sequence using statistical information, the probability being the probability that the particular coded character sequence corresponds to the language,
determining that a probability for any of the coded character sequences is zero,
comparing a code point of a coded character sequence having a probability of zero to respective code point definitions of each of the plurality of languages to affect a comparison,
determining that the coded character sequence includes illegal code points for at least one language of the plurality of languages based on the comparison and eliminating the at least one language as a language to which the coded character sequence could correspond,
removing the probability from an overall probability calculation when determining that the probability is zero and that the coded character sequence does not include an illegal code point, and
using the probabilities to calculate the overall probability that the data string corresponds to the language;
comparing the calculated overall probabilities among the languages in the plurality of languages; and
identifying a language as corresponding to the data string based on comparing the calculated overall probabilities.

11. A non-transitory machine-readable storage device encoded with a computer program product for identifying a language corresponding to a string of data, the computer program product being operable to cause a data processing apparatus to perform operations comprising:
receiving a data string comprising a string of code points defining characters of a language where one or more of the code point values corresponds to more than one distinct character set;
dividing the data string into a plurality of coded character sequences for each of a plurality of languages to represent the same number of characters in each language of the plurality of languages, wherein a length of one or more coded character sequences varies among different languages;
analyzing the coded character sequences to calculate, for each of the plurality of languages, an overall probability that the data string corresponds to a particular language, the analyzing coded character sequences for each language including:
calculating a probability for each coded character sequence using statistical information, the probability being the probability that the particular coded character sequence corresponds to the language,
determining that a probability for any of the coded character sequences is zero,
comparing a code point of a coded character sequence having a probability of zero to respective code point definitions of each of the plurality of languages to affect a comparison,
determining that the coded character sequence includes illegal code points for at least one language of the plurality of languages based on the comparison and eliminating the at least one language as a language to which the coded character sequence could correspond,
removing the probability from an overall probability calculation when determining that the probability is zero and that the coded character sequence does not an include illegal code point, and
using the probabilities to calculate the overall probability that the data string corresponds to the language;
comparing the calculated overall probabilities among the languages; and
identifying a language as corresponding to the data string based on comparing the calculated overall probabilities.

12. The non-transitory storage device of claim 11, wherein dividing the data string further includes operations comprising:
selecting, for each of the plurality of languages, a character set that maps characters to code points;
identifying a first character set that includes characters encoded using a first number of bytes and a second character set that includes characters encoded using a second number of bytes; and
dividing the data string into coded character sequences corresponding to an equal number of characters but a different number of bytes for each of a first language corresponding to the first character set and a second language corresponding to the second character set.

13. The non-transitory storage device of claim 12, wherein the data string is divided, for each of the plurality of languages, into multiple sets of coded character sequences, with the coded character sequences in each set having a different number of characters from the coded character sequences in another of the sets.

14. The non-transitory storage device of claim 13, wherein the calculated overall probability for each of the plurality of languages comprises probabilities calculated for each of the multiple sets of coded character sequences.

15. The non-transitory storage device of claim 13, wherein each set of coded character sequences is selected from the group consisting of a unigram, bi-gram, tri-gram, quarto-gram, and n-gram sequence with n having an integer value.

16. The non-transitory storage device of claim 11, wherein identifying a language further includes operations comprising:
identifying, as the language corresponding to the data string, a language having a calculated overall probability indicating that the data string is more likely, by at least a threshold amount, to correspond to the language than to correspond to any other language from the plurality of languages.

17. The non-transitory storage device of claim 11, wherein analyzing the coded character sequences includes operations comprising:

identifying any unused code points;

when a coded character sequence for a language includes an unused code point, determining that the data string does not correspond to the language; and when a coded character sequence for a language does not include unused code points but does not match any coded character sequence in a collection of statistical information for the language, calculating the overall probability for the set of coded character sequences for the particular language without considering the particular coded character sequence.

18. The non-transitory storage device of claim 11, wherein comparing the calculated overall probabilities further includes operations comprising:

performing a secondary analysis on the coded character sequences for languages having similar calculated probabilities, including:

using language characteristics to identify an unlikely character combination; and determining the language corresponding to the data string using the secondary analysis results.

* * * * *